United States Patent [19]

Lau

[11] 4,390,920
[45] Jun. 28, 1983

[54] SWITCHING DEVICE FOR THE SHORT-CIRCUIT AND OVERLOAD PROTECTION OF A POWER SWITCHING CIRCUIT

[75] Inventor: Waldemar Lau, Hockenheim, Fed. Rep. of Germany

[73] Assignee: Brown, Boveri & Cie AG, Mannheim, Fed. Rep. of Germany

[21] Appl. No.: 331,610

[22] Filed: Dec. 17, 1981

[30] Foreign Application Priority Data

Dec. 20, 1980 [DE] Fed. Rep. of Germany ....... 3048249

[51] Int. Cl.³ .............................................. H02H 3/08
[52] U.S. Cl. ........................................ 361/75; 361/94
[58] Field of Search ...................... 361/71, 74, 75, 94, 361/98, 100

[56] References Cited

U.S. PATENT DOCUMENTS 3,899,718 8/1975 Schafe ................................... 361/98
3,979,645 9/1976 Wittenzellner ................... 361/75 X Primary Examiner—Harry E. Moose, Jr.
Attorney, Agent, or Firm—Herbert L. Lerner; Laurence A. Greenberg

[57] ABSTRACT

Switching device for the short-circuit and overload protection of a power switching circuit, including an input, an output, a first AND gate, a power amplifier, a current limiter circuit and a current sensor connected in series between the input and output, the first AND gate having an inverting input, a threshold value switch connected to the current sensor for producing a current sensor-shaped signal to be fed to the inverting input of the first AND gate, a digital switch-in retarder for delaying the arrival of the current sensor-shaped signal at the inverting input of the first AND gate by producing a given switch-in time lag for blocking the first AND gate until a given switch-off time lag has run out in case of short-circuits and overloads, the digital switch-in retarder including a second AND gate having a first input, a second input, a third inverting input and an output, and a first counter being after-connected to the second AND gate and having a pulse timing input, a resetting input and an output, the first input of the second AND gate being connected to the threshold value switch, an oscillator connected to the second input of the second AND gate, the third inverting input of the second AND gate being connected to the output of the first counter, the output of the second AND gate being connected to the pulse timing input of the first counter, the output of the first counter being connected to the inverting input of the first AND gate, and a second counter for producing the given switch-off time lag, the second counter having an input connected to the oscillator and an output connected to the resetting input of the first counter.

6 Claims, 3 Drawing Figures

SWITCHING DEVICE FOR THE SHORT-CIRCUIT AND OVERLOAD PROTECTION OF A POWER SWITCHING CIRCUIT

The invention relates to a switching device for the short-circuit and overload protection of a power switching circuit, including an input and output and a first AND gate, a power amplifier, a current limiter circuit, and a current sensor connected in series therebetween, the current sensor being connected to a threshold value switch, and wherein in case of a short-circuit or an overload a signal produced by the current sensor is delayed by a switch-on time lag and arrives at the inverting input of the first AND gate and blocks the latter until a switch-off lag time has run out.

Such a switching device is known from German Published, Non-Prosecuted Application DEOS 26 40 337. The switch-on time and switch-off time lags in that device are produced by means of a timeable retarder. The drawback in this case is that any interference pulses transmitted through the current sensor and the threshold value switch can negatively affect the short-circuit and overload protection, i.e. in the worst case the output is switched off.

It is accordingly an object of the invention to provide a switching device for the short-circuit and overload protection of a power switching circuit, which overcomes the hereinafore-mentioned disadvantages of the heretofore-known devices of this general type, and wherein a setting of switch-in lag and switch-off lag times, as well as an interference pulse suppression, is made feasible in an optimally simple and generally applicable way.

With the foregoing and other objects in view there is provided, in accordance with the invention, a switching device for the short-circuit and overload protection of a power switching circuit, comprising an input, an output, a first AND gate, a power amplifier, a current limiter circuit and a current sensor connected in series between the input and output, the first AND gate having an inverting input, a threshold value switch connected to the current sensor for producing a current sensor-shaped signal to be fed to the inverting input of the first AND gate, a digital switch-in retarder for delaying the arrival of the current sensor-shaped signal at the inverting input of the first AND gate by producing a given switch-in time lag for blocking the first AND gate until a given switch-off time lag has run out in case of short-circuits and overloads, the digital switch-in retarder including a second AND gate having a first input, a second input, a third inverting input and an output, and a first counter being after-connected to the second AND gate and having a pulse timing input, a resetting input and an output, the first input of the second AND gate being connected to the threshold value switch, as oscillator connected to the second input of the second AND gate, the third inverting input of the second AND gate being connected to the output of the first counter, the output of the second AND gate being connected to the pulse timing input of the first counter, the output of the first counter being connected to the inverting input of the first AND gate, and a second counter for producing the given switch-off time lag, the second counter having an input connected to the oscillator and an output connected to the resetting input of the first counter.

In accordance with another feature of the invention, there is provided a capacitor and another input terminal connected between the capacitor and the oscillator.

In accordance with a further feature of the invention, there is provided an OR gate having two inputs and an output, one of the inputs of the OR gate being connected to the output of the threshold value switch and the other of the inputs being connected to the output of the first counter, and a message signal output terminal connected to the output of the OR gate.

In accordance with an added feature of the invention, there is provided a NOR gate having one input connected to the output of the threshold value switch, another input connected to the oscillator and an output, a message memory having a dominantly settable input connected to the output of the first counter, a further input connected to the output of the NOR gate and an output, and a message signal output terminal connected to the output of the message memory.

In accordance with an additional feature of the invention, there is provided an OR gate having an output connected to an input of the first counter, an input connected to the output of the second AND gate and another input, and a third AND gate having an output connected to the other input of the OR gate, first and second inverting inputs and first and second further inputs, the third AND gate having the first inverting input thereof connected to the output of the first counter, the second inverting input connected to the output of the threshold value switch, the first further input connected to the oscillator and the second further input connected to the further output of the first counter, and the further input of the first counter being connected to the output of the threshold value switch.

In accordance with a concomitant feature of the invention, the current limiter circuit has at least two inputs and the current sensor has at least one output, and including a reference voltage terminal, and a reference element having an input being connected to the reference voltage terminal for loading, an output being connected to one of the inputs of the current limiter circuit and another output being connected to the threshold value switch, another of the inputs of the current limiter circuit being connected to one of the outputs of the current sensor.

The special advantages obtained through the use of the invention reside in the fact that the operation of any given amount of functions of the short-circuit and/or overload protection system is made feasible with only one capacitor unit. Both switch-in and switch-off times during pulse timing operations are obtained in case of a short-circuit or an overload, and the suppression of interference pulse effects produced on the short-circuit protection device are obtained by using only one capacitor. This not only saves the user considerable costs and space required for capacitors, but saves circuit connections, which results in allowing accomodation in a preset circuitry housing of a greater amount of functional units (i.e. the short-circuit and/or overload protection system). A plurality of parallel-connected protective devices can be of advantage for higher power outputs. A further related advantage is that upon the occurence of overloads or short-circuits, the switching stage issues a message or alarm signal.

Other features which are considered as characteristic for the invention are set forth in the appended claims.

Although the invention is illustrated and described herein as embodied in a switching device for the short-circuit and overload protection of a power switching circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
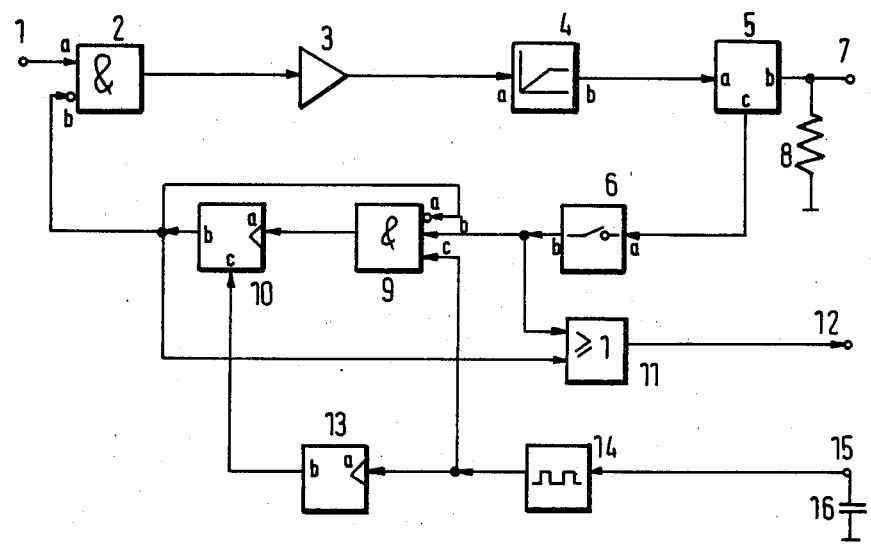
FIG. 1 is a schematic circuit diagram of a switching device for the short-circuit and overload protection of a power switching circuit.

Referring now to the figures of the drawing and first particularly to FIG. 1 thereof, it is seen that a switching device for the short-circuit and overload protection of a power switching circuit is shown therein. An input terminal 1 is connected to the input a of an AND gate 2, which has the output thereof wired to a power amplifier 3. A current limiter circuit 4 receives its input from the power amplifier 3 and has its output b connected to the input a of a current sensor 5. A threshold value switch 6 receives its input a from the output c of the current sensor 5. The output b of the current sensor 5 is connected to an output terminal 7. A load resistor 8 is connected between the output terminal 7 and ground.

The threshold value switch 6 is connected to the input b of an AND gate 9 through its output b. The output of the AND gate 9 is fed to the pulse timer of a counter 10. The output b of the counter 10 is connected to the input b of the AND gate 2, to the input a of the AND gate 9, as well as to one of the inputs of an OR gate 11. Another input of the OR gate 11 is wired to the output b of the threshold value switch 6. The output of the OR gate 11 is connected to a message or alarm signal output terminal 12.

A counter 13 is controlled by an oscillator 14 and its dynamic input a. The output of the counter 13 is connected to the reset input c of the counter 10. The oscillator 14 further controls the input c of the AND gate 9, and has the input thereof connected to an oscillator input terminal 15. A capacitor 16 is connected between the input terminal 15 and ground.

Figure 2:
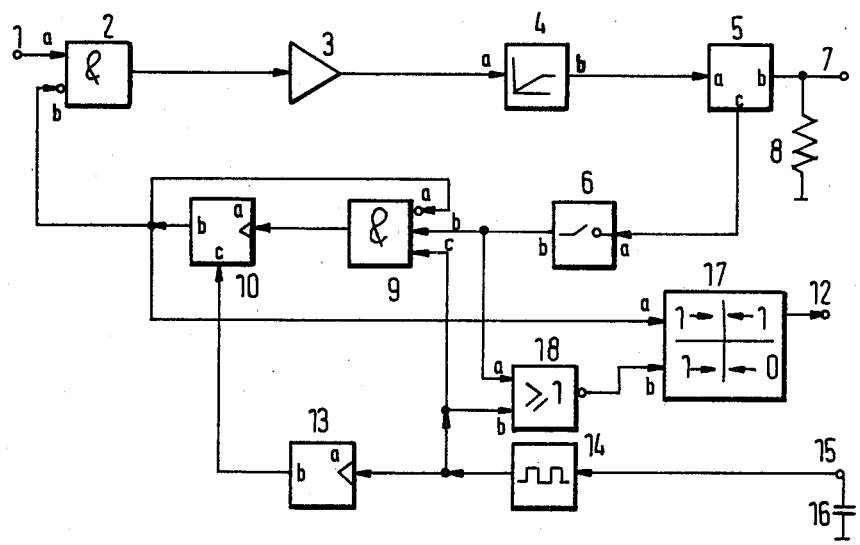
FIG. 2 is a circuit diagram of an expanded switching device having a message memory.

FIG. 2 shows an expanded version of the switching device with a message memory. With exception of the OR gate 11, the circuit according to FIG. 2 has the same structural elements and wiring as the circuit shown in FIG. 1, and additionally includes a message memory 17, and a NOR gate 18. The additional hardware (elements 17 and 18) is connected as follows: The input a of the message memory 17 is connected to the output b of the counter 10, while the input b of the memory 17 is connected to the output of the NOR gate 18. The output of the memory 17 is applied to the message signal output terminal 12. The input a of the NOR gate 18 is connected to the output of the threshold value switch 6, while the input b of the NOR gate 18 is connected to the output of the oscillator 14.

The following is a description of the operation of the switching device for the short-circuit and overload protection of a power switching circuit. Under standard operating conditions (i.e., with an 0-signal applied to the terminal b of the AND gate 2) the application of a 1-signal to the input terminal 1 provides the output terminal 7 with a 1-signal for supplying the load resistor 8. Upon the occurence of an overload or a short-circuit produced at the output terminal 7, a rise in current flow is measured by means of the current sensor 5. If the current flow value transmitted to the threshold value switch 6 exceeds a preset threshold value then the threshold value switch 6 connects a 1-signal through to the input of the AND gate 9.

With the threshold value switch 6 activated, the switch-in retarder 9/10 comprising the AND gate 9 and the counter 10 is switched in, and simultaneously a message signal is sent to the output terminal 12 through the OR gate 11. The digital switch-in retarder 9/10 obtains its pulse timer frequency through the input c of the AND gate 9 from the oscillator 14, the frequency determining element of which is the capacitor 16. The digital switch-in retarder 9/10 remains switched in over a switch-in time lag period $t_1$. Following the runout of the period $t_1$, a 1-signal appears on the retarder output b which blocks the retarder pulse timer input a through the inverting input a of the AND gate 9; the 1-signal appearing as a message signal on the output terminal 12, and being fed to the inverting input b of the AND gate 2.

Consequently, the output value of the AND gate 2 is switched from the 1-signal to the 0-signal, and an 0-signal is fed to the output terminal 7, i.e. the load resistor 8 is switched off. By using a lamp as the load resistor 8, for example, the short-time high-rise switch-in current (rated at the initially low load resistance) produces no immediate switch-off of the output terminal 7 because of the switch-in time lag $t_1$. During this period $t_1$ the current flow is limited by the current limiter circuit 4.

After the runout of a switch-off time lag $t_2$ being formed by the counter 13, a pulse from the output b of the counter 13 arrives at the reset input c of the counter 10, which resets the counter 10, i.e. instead of a 1-signal a 0-signal appears at the output b of the counter 10. This 0-signal is also fed to the inverting input b of the AND gate 2, and consequently the output terminal 7 again receives a 1-signal. Furthermore, the message signal on the terminal 12 disappears. The counter 13 used for setting the switch-off time lag $t_2$ obtains its timer frequency from the oscillator 14.

Upon the occurence of a sustained overload or short-circuit at the output terminal 7, after the switch-in time lag $t_1$ has elapsed, the resistor 8 is periodically switched off, and when the switch-off time lag $t_2$ has elapsed, it is switched on again as described, so that the signal at the output terminal 7 is timed with a pulse duration according to the switch-in time lag $t_1$ and with a no-current duration according to the switch-off time lag $t_2$, i.e. a period of repeated switch-in attempts follows. The switch-in pulse duration and the switch-off pulse duration are a function of the capacitance of the capacitor 16 and are set at a constant ratio with respect to each other. When an overload or short-circuit produced during the pulse duration at the output terminal 7 occurs, the output current is limited by the current limiter circuit 4.

During the pulse timing operation, when applying the 1-signal from the threshold value switch 6 to the OR gate, and when applying the signal to the output b of the counter 10, the 1-signal formed by the OR gate is fed as a message signal to the terminal 12.

The switching device according to FIG. 2 differs in its operation from the switching device according to FIG. 1 in that any interference signals produced at the output terminal 7 are blocked from arriving at the message signal output terminal 12 because of the interference signal suppression being controlled at that point through the digital switch-in retarder 9/10 by means of the message memory 17.

The dominantly settable message memory 17 is dominantly set by a 1-signal from the output b of the counter 10, and accordingly issues a message signal to the terminal 12. The message memory 17 is then and only then erased, if an 0-signal is applied to the output b of the counter 10, and to the inputs a and b of the NOR gate 18. In this case an 0-signal is applied to the output terminal 12.

The NOR operative connection (element 18) of the output signal from the threshold value switch 6 to the output signal of the oscillator 14 is used during the pulse timing of the output signal at the terminal 7 to prevent a resetting of the message memory 17 produced because of transit time delays in the AND gate 2, the power amplifier 3, the current limiter circuit 4, the current sensor 5, and the threshold value switch 6 in case of an overload. A prerequisite for this is the synchronization of the oscillator pulse at the input b of the NOR gate 18 with the reset pulse at the output b of the counter 13 (the 0-1 signal edges of oscillator and reset pulses are especially to be simultaneously switched from 0 to 1).

If a higher power output at the output terminal 7 is required, then a plurality of the hereinafore-described switching devices can be connected in parallel to the output terminal 7.

Figure 3:
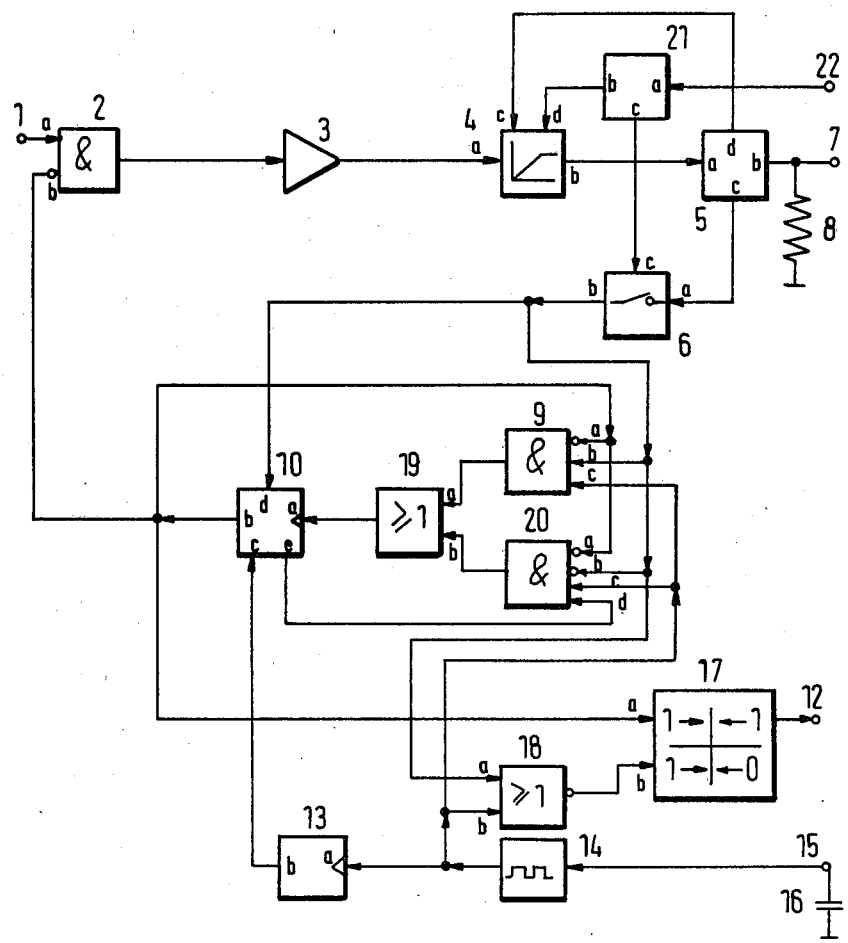
FIG. 3 is a circuit diagram of another expanded switching device for boosting the output power and immunity from noise or distortion.

In FIG. 3 an expanded switching circuit for boosting the output power and the immunity from noise or distortion is shown. The device according to FIG. 3 contains the same components and connections as the device according to FIG. 2, and additionally contains an OR gate 19, an AND gate 20, a reference element 21, and a reference voltage connection 22. The additional components 19, 20, 21, and 22 are connected as follows:

The OR gate 19 has inputs a or b which are connected to the output of the AND gate 9 or the AND gate 20, respectively. The output of the OR gate 19 is connected to the input a of the counter 10. The inverting input a of the AND gate 20 is connected to the output b of the counter 10, while the inverting input b of the AND gate 20 is applied to the output b of the threshold value switch 6. The further inputs c and d of the AND gate 20 are connected to the output of the oscillator 14 and the output e of the counter 10, respectively. The output b of the threshold value switch 6 is further connected to the input d of the counter 10.

The input a of the reference element 21 is wired to the reference voltage connection 22. The reference element 21 has outputs b and c which are connected to the input d of the current limiter circuit 4 and the input c of the threshold value switch 6, respectively. A further input c of the current limiter circuit 4 is connected to the output d of the current sensor 5.

The immunity from noise or distortion, especially after only few counting steps of the counter 10, is boosted by interconnecting the components 19 and 20. The counter 10 is of a forward/backward counter type, which upon the occurence of a 1-signal at its input d is reversible to a forward counting direction, upon an 0-signal is reversible to a backward counting direction, upon a counter content >0 issues a 1-signal, and upon a counter content equal to 0 issues an 0-signal through its output e.

If a 1-signal is present at the output b of the threshold value switch 6, then the counter 10 counts in a forward direction, namely until a 1-signal appears at the output b of the counter 10, which results in a switch-off of the output terminal 7 through the input b of the AND gate 2; furthermore, the appearance of a 1-signal at the output b of the counter 10 blocks the forward counting direction through the input a of the AND gate 9, and blocks the backward counting direction through the input a of the AND gate 20. If the output b of the threshold value switch 6 alternates from the 1-signal to the 0-signal before the time lag has run out, then the counter 10 is switched and changed over to the backward counting direction, and the AND gate 20 is released through its input b, so that the counter 10 counts in a backward direction until the counter content equal to 0 is reached and an 0-signal appears at the output e of the counter 10, which results in the blocking of any further backward counting of the counter 10 through the input d of the AND gate 20.

An advantageously improved increase in the output power is reached by having the current limiter circuit 4 controlled through its input c by the output d of the current sensor 5 in such a way that the current sensor 5 together with the current limiter 4 produces a control circuit thereof; a further advantageous improvement is found in controlling the current limiter circuit 4 through its input d, and in controlling the threshold value switch 6 through its input c, by means of the reference element 21 in such a way that the threshold value switch 6 is triggered first, and that upon the occurence of a minor rise of the output current at the output terminal 7 the current limiter circuit 4 limits the current. The low differential effective between the switch-off current at the threshold value switch 6 and the limiter current at the current limiter circuit 4 results in an improved switching stage loading.

Another advantageous improvement in the switching device is produced by superposing a voltage on the reference voltage (which in integrated circuits usually has the drawback of large tolerances) being generated by the reference element 21. This voltage is a low-tolerance type of variable reference voltage to be applied across the external reference voltage terminal 22, which can minimize the power dissipation of an integrated switching stage, and thus can maximize the output power at the terminal 7; with this advantageous improvement a minimal power dissipation is also feasible for external extension stages for higher current intensities to be connected to the output terminal 7.

For practical purposes the hereinafore-described switching device has a monolithically integrated circuit construction formed by means of linear high-voltage techniques.

I claim:

1. Switching device for the short-circuit and overload protection of a power switching circuit, comprising an input, an output, a first AND gate, a power amplifier, a current limiter circuit and a current sensor connected in series between said input and output, said first AND gate having an inverting input, a threshold value switch connected to said current sensor for producing a current sensor-shaped signal to be fed to said inverting input of said first AND gate, a digital switch-in retarder for delaying the arrival of the current sensor-shaped signal at said inverting input of said first AND gate by producing a given switch-in time lag for blocking said first AND gate until a given switch-off time lag has run out in case of short-circuits and overloads, said digital switch-in retarder including a second AND gate having a first input, a second input, a third inverting input and an output, and a first counter being after-connected to said second AND gate and having a pulse timing input, a resetting input and an output, said first input of said second AND gate being connected to said threshold value switch, an oscillator connected to said second input of said second AND gate, said third inverting input of said second AND gate being connected to said output of said first counter, said output of said second AND gate being connected to said pulse timing input of said first counter, said output of said first counter being connected to said inverting input of said first AND gate, and a second counter for producing said given switch-off time lag, said second counter having an input connected to said oscillator and an output connected to said resetting input of said first counter.

2. Switching device according to claim 1, including a capacitor and another input terminal connected between said capacitor and said oscillator.

3. Switching device according to claim 1, including an OR gate having two inputs and an output, one of said inputs of said OR gate being connected to the output of said threshold value switch and the other of said inputs being connected to said output of said first counter, and a message signal output terminal connected to said output of said OR gate.

4. Switching device according to claim 1, including a NOR gate having one input connected to the output of said threshold value switch, another input connected to said oscillator and an output, a message memory having a dominantly settable input connected to said output of said first counter, a further input connected to said output of said NOR gate and an output, and a message signal output terminal connected to said output of said message memory.

5. Switching device according to claim 1, wherein said first counter has a further input and a further output, and including an OR gate having an output connected to an input of said first counter, an input connected to said output of said second AND gate and another input, and a third AND gate having an output connected to said other input of said OR gate, first and second inverting inputs and first and second further inputs, said third AND gate having said first inverting input thereof connected to said output of said first counter, said second inverting input connected to the output of said threshold value switch, said first further input connected to said oscillator and said second further input connected to said further output of said first counter, and said further input of said first counter being connected to the output of said threshold value switch.

6. Switching device according to claim 1, wherein said current limiter circuit has at least two inputs and said current sensor has at least one output, and including a reference voltage terminal, and a reference element having an input being connected to said reference voltage terminal for loading, an output being connected to one of said inputs of said current limiter circuit and another output being connected to said threshold value switch, another of said inputs of said current limiter circuit being connected to one of said outputs of said current sensor.

* * * * *